July 5, 1960 G. T. ROYDEN ET AL 2,944,110

ERROR SUPPRESSING TELEGRAPH SYSTEM

Filed July 27, 1956

5 Sheets-Sheet 1

INVENTORS
GEORGE T. ROYDEN
JOHN W. BUTTERWORTH
BY
AGENT

ERROR SUPPRESSING TELEGRAPH SYSTEM

Filed July 27, 1956

5 Sheets-Sheet 2

INVENTORS
GEORGE T. ROYDEN
JOHN W. BUTTERWORTH
BY
AGENT

INVENTORS
GEORGE T. ROYDEN
JOHN W. BUTTERWORTH
BY
AGENT

INVENTORS
GEORGE T. ROYDEN
JOHN W. BUTTERWORTH
BY
AGENT

INVENTORS
GEORGE T. ROYDEN
JOHN W. BUTTERWORTH
BY
AGENT

United States Patent Office 2,944,110

Patented July 5, 1960

2,944,110

ERROR SUPPRESSING TELEGRAPH SYSTEM

George Taylor Royden, South Orange, and John William Butterworth, Wayne Township, Paterson, N.J., assignors to Mackay Radio and Telegraph Company, New York, N.Y., a corporation of Delaware Filed July 27, 1956, Ser. No. 600,524

11 Claims. (Cl. 178—23)

Figure 1A:
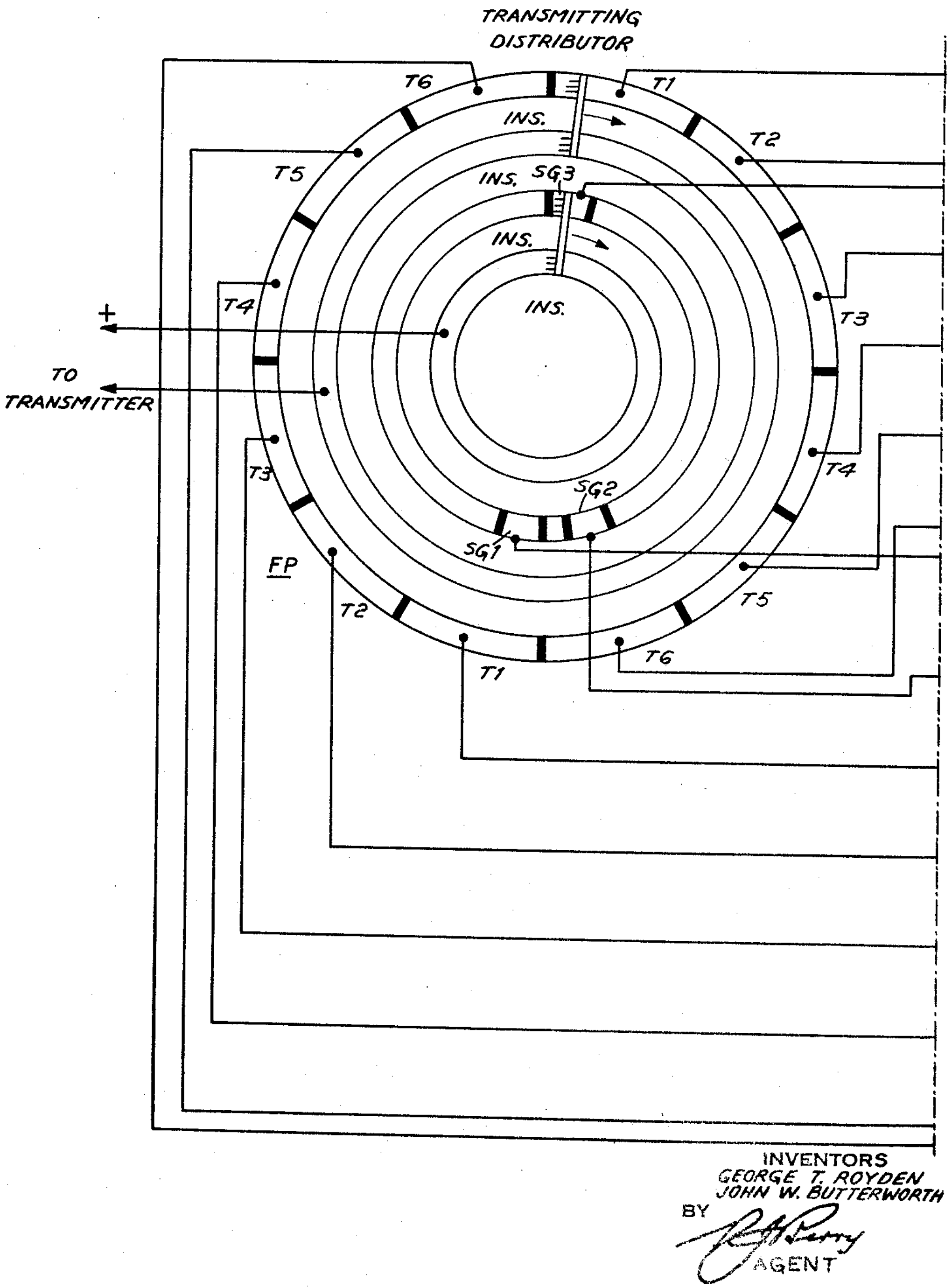

This invention relates to telegraph systems and more particularly to systems for detecting and suppressing errors in printing telegraph systems.

Printing telegraph systems of the kind now generally in use employ the Baudot code in which each character is represented by five time elements consisting of combinations of space and mark impulses. Such signals sent over a radio channel or carrier wave conductor channel are often subject to fading or to mutilation due to static and other interference.

In order to assure accuracy of received messages systems have been used in which each character is repeated and comparison is made of the received character signals. If the repeated signal characters are not identical an error signal is printed or other alarm given. This system, however, suffers from the disadvantage that an error in either of the repeated signals voids that character, resulting in a relatively large percentage of rejections.

Another system provides that each character of a code signal shall have the same number of mark and space elements. This system, however, requires a special code and cannot be used with the standard systems such as Baudot code without additional translation.

It is an object of our invention to provide a new method of code signalling for operation of telegraph equipment which may operate on standard codes and which provides means which in response to the code signals will actuate a printer so long as the received signals are not mutilated but will prevent printing and/or provide an error indication when a signal is mutilated.

According to our invention we propose to use a code, for example, the five-unit Baudot code, which consists of combinations of mark and space impulses, and to insert at the transmitter an additional sixth signal element so chosen that the total number of mark signal elements for every character will be an odd number. The received mark signal elements are counted at the receiving terminal and if their sum is an even number the character is suppressed and an error indication is provided. Alternatively, of course, the additional sixth element may be so chosen that the total number of mark elements for a correct signal is always an even number.

According to a further feature of our invention, the modified character code signal is transmitted first on one channel and then on a second channel of a multiplex telegraph system. At the receiving terminal, if an error is not detected in the first transmission the second transmission is ignored. If an error is detected in the first transmission, it is suppressed and the second transmission is scanned. If an error is not detected in the second transmission, the received character is printed or otherwise utilized, but should an error be detected in the second transmission following an error in the first transmission, an error indication is provided.

Figure 1B:
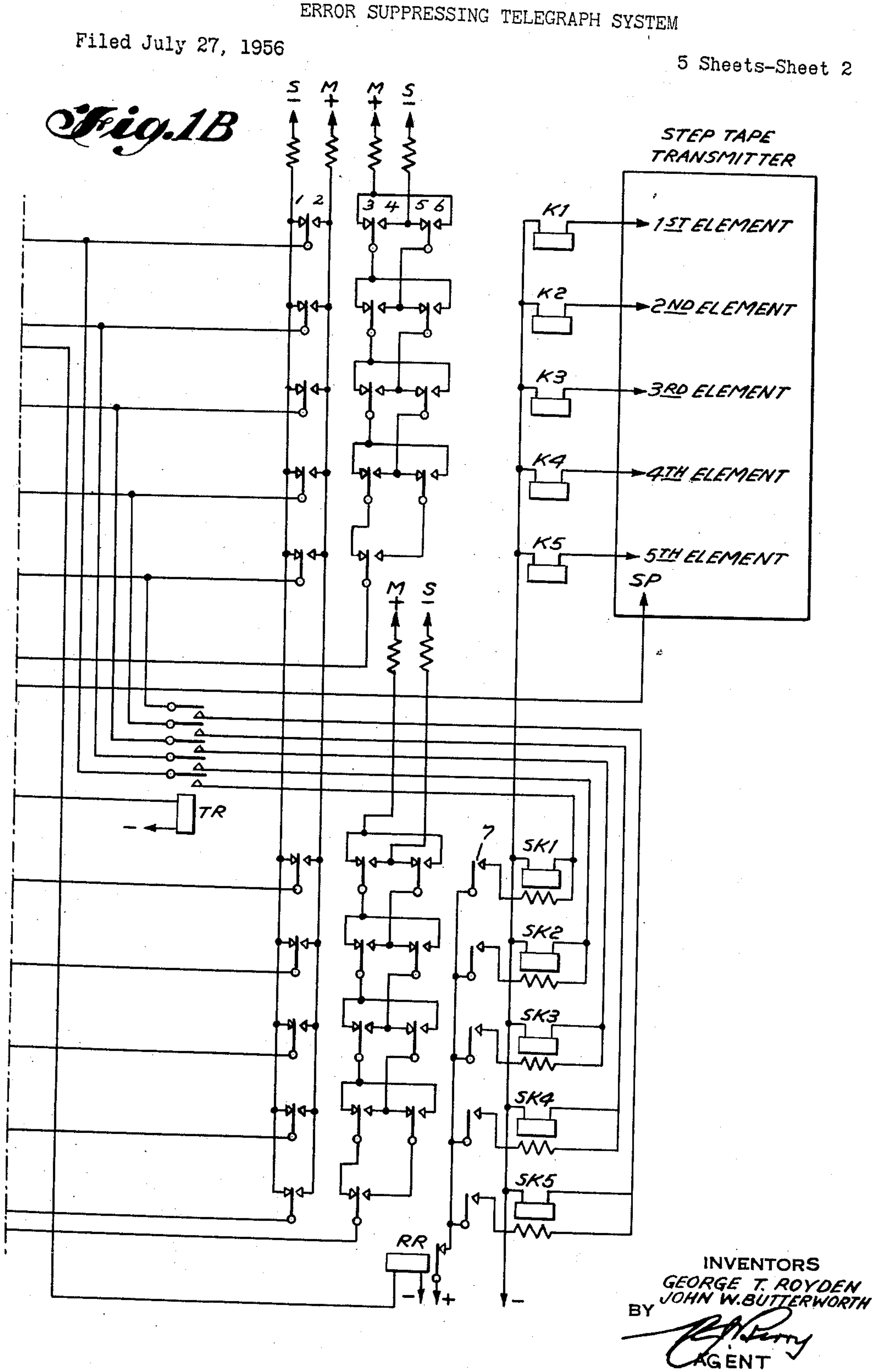
Figure 2:
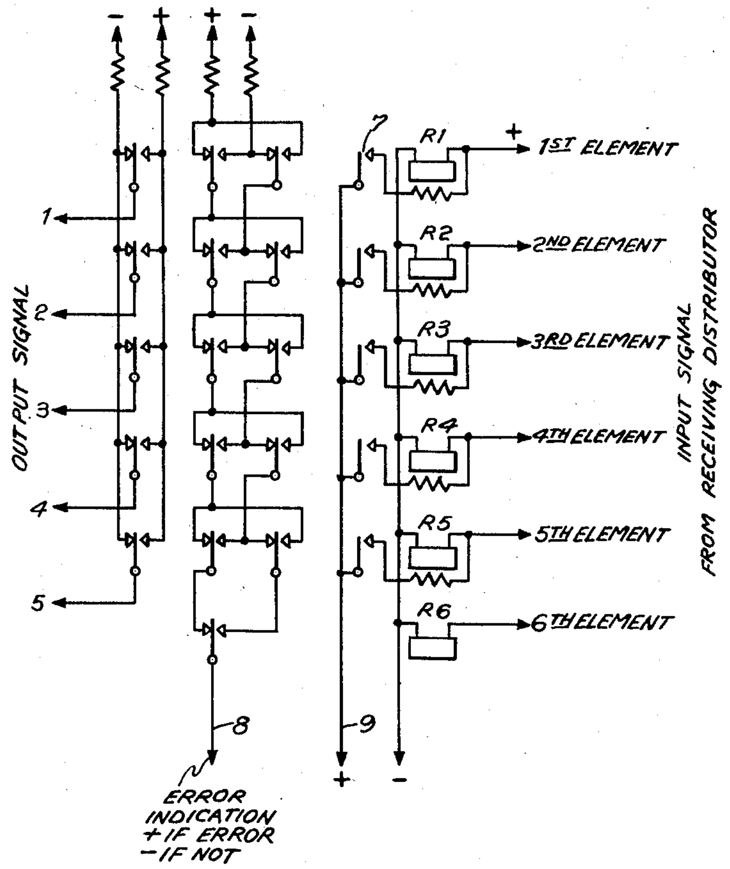
Figure 3A:
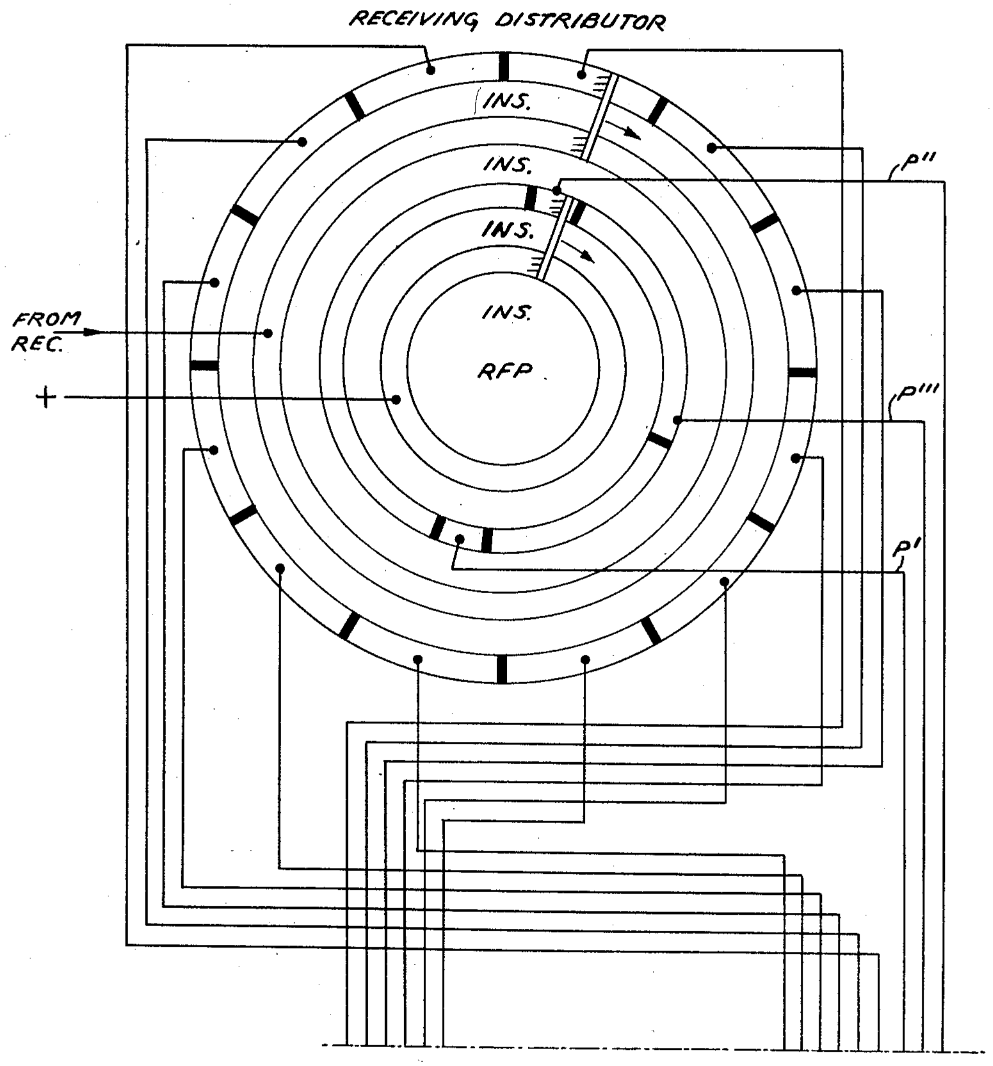
Figure 3B:
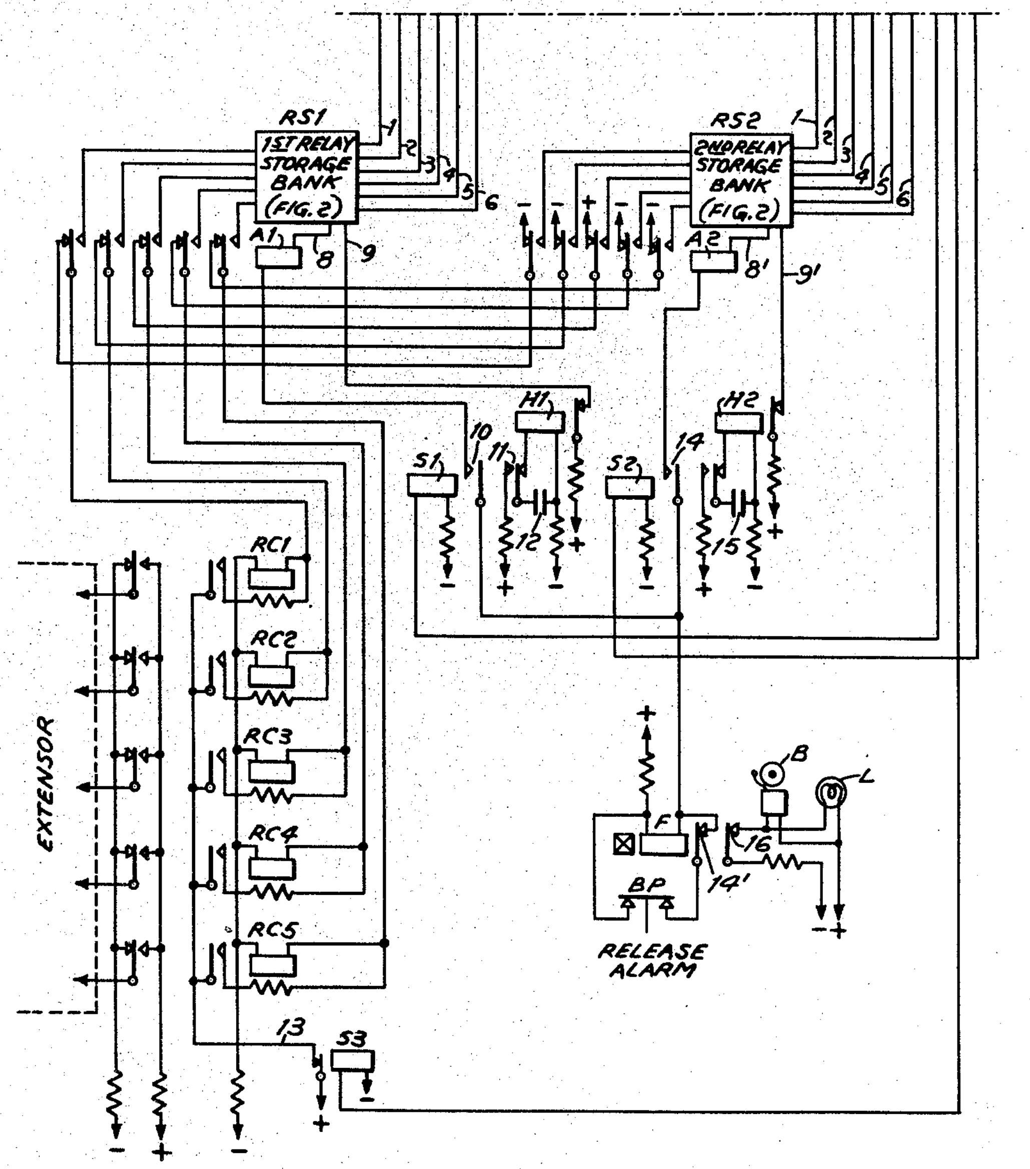

The above and other features of the invention will be better understood from the following description read in conjunction with the accompanying drawings which illustrate a preferred embodiment of our invention, and in which:

Figs. 1*a* and 1*b*, with Fig. 1*a* placed to the left of Fig. 1, are a diagram of a circuit used at the transmitting terminal for converting the five-unit character codes to the six unit codes employed in practising our invention, Fig. 2 is a circuit diagram of a relay storage bank used at the receiving terminal, and Figs. 3*a* and 3*b*, with Fig. 3*a* placed above Fig. 3*b* are a circuit diagram of the error detecting equipment used at the receiving terminal.

Fig. 1 shows the circuit at the sending terminal for scanning each 5-element character and adding a sixth element so chosen that the total number of mark (M) elements will always be an odd number. It will be obvious, however, that the system could alternatively employ an even number of mark elements.

The circuit of Fig. 1 comprises five relays K1 to K5, one for each signal element of the Baudot 5-unit code. One side of each of the windings of these relays is connected to negative battery and the other side of these windings is connected respectively to contacts controlled by the five code element sensing pins of a stepping tape transmitter of well-known type. Other suitable known means may be used, however, for operating the relays K1 to K5 in accordance with the signal elements.

Each relay K1 to K4 is provided with three sets of change-over contacts 1—2, 3—4, 5—6, whilst the relay K5 need only be provided with two such sets 1—2 and 3—4. The back and front contacts 1 and 2 of the sets 1—2 are respectively connected to negative (space) and positive (mark) battery whilst the armature springs associated with these contact sets are respectively connected to the segments T1 to T5 of one channel of a transmitter face plate FP of a multiplex distributor and to respective armature springs of a transfer relay TR. The front contacts 4 of the sets 3—4 of relays K1 to K4 are connected respectively to the back contacts 5 of the sets 5—6 of the same relays, and the back contacts 3 are similarly connected to the front contacts 6 of the same relays. The back contact 3 and the front contact 6 of relay K1 are connected to positive (mark) battery, and the front contact 4 and back contact 5 of this relay are connected to negative (space) battery. The back contacts 3 of relays K1 to K5 are connected in a chain including the armature springs associated with contact sets 3—4 of relays K1 to K4, and the back contacts 5 of relays K1 to K4 and the front contact 4 of relay K5 are connected in a chain including the armature springs associated with contact sets 5—6 of relays K1 to K4. The armature spring associated with contact set 3—4 of relay K5 is connected to a sixth element position T6 of the same channel on the transmitting face plate.

With the above described arrangement of the contacts of the code element relays K1 to K5 it will be seen that a sixth element is added to each five element character so that the total number of mark (M) elements is always odd. For example, the letter A, which is MMSSS in Baudot code, becomes MMSSSM, and the letter O, which is SSSMM, becomes SSSMMM. If the number of mark elements in the five element code is already odd, for example, the letter B (MSSMM), a sixth space (S) element is added.

The transmitter is arranged in known manner to send the stored six element code first over one channel and then over a second channel of a radio multiplex telegraph system, for example, of the frequency shift keying type.

Since it is desirable to step the tape transmitter during the time that another channel is being sent, it is necessary to provide a second bank of storage relays SK1 to SK5, a transfer relay TR and a release relay RR. One end of each of the windings of relays SK1 to SK5 is connected to a respective front contact of the transfer relay TR, the other ends being connected in parallel to negative battery. Contacts of these relays SK1 to SK5 are arranged in the same manner as those of the relay bank K1 to K5 but these relays are provided additionally with holding contacts 7 included in parallel holding circuits extending over a back contact of release relay RR. The armature springs associated with the contact sets 1—2 are respectively connected to the segments T1 to T5 of a second channel of the face plate FP and the armature spring of contact set 3—4 of relay SK5 is connected to a sixth element position of T6 of that channel.

The tape transmitter stepping lead SP is connected to an inner segment SG1 of the face plate FP so that it is timed to step the tape transmitter during the time that the distributor brush passes over the first segment T1 (lower) of the second channel. The winding of the transfer relay TR is connected to an inner segment SG2 so that this relay is timed to operate during the first T6 pulse (lower segment) and the winding of the release relay RR is connected to an inner segment SG3 whereby it is timed to operate during the time that the brush is passing over the first T1 segment (upper segment) of the first channel.

It will be clear that when the tape transmitter has sensed a five-element code, the relays of the bank K1 to K5 are energized accordingly and corresponding mark or space potentials are applied to the segments T1 to T5 (first channel) of the face plate FP. As already explained, a sixth signal is applied to the sixth segment T6 (first channel) so that the total number of mark signal elements is always an odd number. The first channel is transmitted as the brushes sweep over the segments T1 to T6 (right). During this T6 pulse (lower segment) the transfer relay TR is energized over inner segment SG2, and momentary circuits are completed over its front contacts and contacts 1—2 of relays K1 to K5 to operate corresponding ones of the storage relays SK1 to SK5, which lockup over back contact 7 and back contact of release relay RR and apply the same respective element signals to the segments T1 to T6 (left) of the second channel.

During the time that the distributor brush passes over the first T1 segment (left), a pulse is applied to the lead SP to step the tape transmitter to sense the next five-element code and operate the relay bank K1 to K5 as before. After the transmission of the second channel and during the time that the brush passes over segment T1 (right), the release relay RR is operated over inner segment SG3 and opens the holding circuits of relays SK1 and SK5.

At the receiving terminal, the six element code characters received over the two channels are picked off the receiving distributor face plate RFP, Fig. 3, and scanned in the same manner as the five element characters are scanned by the arrangement of Fig. 1, except that an error is indicated if the number of mark elements is an even number. The receiving distributor is, of course, rotated in synchronism and in phase with the distributor at the transmitting terminal.

Fig. 2 shows a scanning circuit at the receiving terminal R1 to R6 being the six input signal element relays. The arrangement of the contacts of these relays is similar to that of relays K1 to K6 of Fig. 1 with the exception that each relay R1 to R5 is provided with an additional locking contact 7, and the armature spring of relay R6 is connected to an error indicating lead 8. It will be seen that if the received six element code comprises an even number of mark elements, for example, MSSSSM, positive battery (error) is connected to the error indicating lead 8, whereas if it comprises an odd number of mark elements for example MMSSSM, negative battery (no error) is connected to this lead 8.

Referring now to Fig. 3, which is a circuit diagram of the error detecting and indicating arrangement, two storage or scanning relay banks RS1, RS2 similar to Fig. 2 are provided. The six signal pulses of the first transmission are received and stored by the relays (R1 to R6, Fig. 2) of the first storage relay bank RS1, the operated relays locking up over the lead 9 and a back contact of relay H1. After the sixth element has been received, a positive read pulse is taken from the face plate RFP of the receiving distributor and applied over lead P′ to operate momentarily a relay S1 which at contacts 10 applies positive battery via winding of release alarm relay F to the winding of switching relay A1, and at contacts 11 closes a charging circuit for a condenser 12. When relay S1 restores, condenser 12 discharges through the winding of relay H1 which opens the locking circuit over lead 9 for the relays of RS1.

If an error has not been detected in the first storage relay bank RS1 during the first transmission of the character, negative potential applied to the lead 8 as explained with reference to Fig. 2 during the time of the pulse applied to lead P′ will momentarily operate relay A1 which at its front contacts transfers the stored signal to the extensor storage relays RC1 to RC5 which lock up over lead 13 and back contacts of a relay S3. The second transmission of the character stored in relay bank RS2 is ignored.

If an error is detected in the first transmission, a positive potential will be impressed on the lead 8. Relay A1 will therefore not operate when the read pulse over lead P′ momentarily energizes relay S1. The signal stored in relay bank RS1 is, therefore, not transferred to the extensor repeating relays RC1 to RC5. After all six signal element pulses of the second transmission of the character have been received and stored in the relay storage bank RS2, a second read pulse taken from the face plate of the distributor and received over lead P″, momentarily operates relay S2, which at contacts 14 connected positive battery to one side of the winding of relay A2.

If an error in the second transmission is not detected in the storage relay bank RS2, negative potential on the lead 8′ will cause the momentary operation of relay A2 during the time of the second read pulse applied over lead P″, whereby the signal elements stored in RS2 are transferred over front contacts of relay A2 and back contacts of A1 to the extensor relays RC1 to RC5. The five element signals stored in the relays RC1 to RC5 are applied to an extensor over the left hand armatures of the relays. The extensor in known manner converts the multiplex signals to start stop signals suitable for operating a teleprinter or tape perforator.

The energization of relay S2 closes a charging circuit for condenser 15, which on the release of relay S2 discharges through the winding of relay H2. Relay H2 opens the locking circuit for the relays RS2 over the lead 9′.

If an error is detected in the second transmission by the relay bank RS2 when an error has already been detected in the first transmission by the relay bank RS1, positive potential on the lead 8′ prevents relay A2 from operating when relay S2 momentarily pulls up responsive to the second read pulse from the distributor face plate RFP. A signal determined by the polarities connected to the back contacts of relay A2 is thus passed via back contacts of relay A1 to the storage relays RC1 to RC5. In Fig. 3 the polarities indicated are those for a letter Space, but any other signal such as a Blank could be inserted. A third read pulse received from the face plate RFP over lead P‴, a suitable time shortly after the beginning of the next cycle, energizes relay S3 which breaks the locking circuits of relays RC1 to RC5.

A release alarm push button BP is provided which normally short-circuits relay F. If this button is depressed momentarily to remove this short-circuit, current will flow through the winding of relay F during the energization of relays S1 and S2 by the first and second read pulses if there are no errors. This relay F is made slow-to-release by the provision of a copper slug on its heel and is therefore held operated during the intervals between pulses, but will release when two successive pulses fail to complete the circuits over relays A1, A2 and leads 8, 8'. On release, relay F locks itself out of circuit at contacts 14' and at contacts 16 closes a circuit for an alarm bell B and signal lamp L in parallel.

An attendant whose attention is attracted by the alarm, examines the printed text of the message, releases the alarm by actuation of the pushbutton switch BP and decides whether the omission is sufficiently serious to stop the service.

While the principle of our invention has been described above in connection with a specific embodiment, it will be understood that various modifications may be made by those skilled in the art without departing from the spirit of the invention, and that the detailed description is made only by way of example and not as a limitation of the scope of the invention as defined by the appended claims.

For example, while the invention has been described in connection with a conversion from the conventional five unit Baudot code to a six unit code in which the number of mark elements is odd in all transmitted character codes, it may be applied to a system in which a six unit telegraph code is converted to a seven unit code having an odd (or even) number of mark elements or to any system in which the transmitted code comprises combinations of signal elements having one or other of two electrical values so that the total number of signal elements of one of such electrical values is an odd or in the alternative case an even number for each transmitted character code signal. In the appended claims the expression "numerical characteristic" of a number means the odd or even character of such number.

What is claimed is:

1. In a telegraph system for receiving and transmitting conventional five unit code telegraph messages in which the character code signals each comprise five signal elements of either one or other of two electrical values, and in which the number of elements of each electrical value have either an odd or an even numerical characteristic, means for converting said five unit code signals into six unit code signals in which the signal elements of one of said two electrical values in each respective character codes may vary in number as between different character codes but which has the same predetermined numerical characteristic, each six unit code including the five elements of the five unit code in their original relative positions and with their original electrical values, means for transmitting said converted signals over a transmission channel, and receiving apparatus coupled to said channel comprising means for scanning each character code signal to determine whether, in the aggregate, said signal contains elements of said one value having said predetermined numerical characteristic, and means responsive to said last-mentioned means for converting the six unit code signals back into said conventional five unit code.

2. In a telegraph system, means for adding to each character code signal for a conventional five code an additional sixth signal element so chosen that every character code signal comprises an odd number of mark signal elements, each six unit code including the five elements of the five unit code in their original relative positions and with their original electrical values, means for transmitting such six unit character code signals, receiving apparatus, and transmission path means coupling said transmitting means and said receiving apparatus, said receiving apparatus comprising means for scanning each received character code signal to distinguish between true signals comprising an odd number of mark signal elements and mutilated signals which do not.

3. In a telegraph system, a source of conventional five unit character code signals at a transmitting terminal, a bank of five relays one for each signal element constituting said code signals, means for energizing said relays dependent upon whether the respective signal elements of a character code signal comprise mark or space signals, circuits including contacts of said relays for determining whether the number of mark elements in said character code signal is odd or even, means controlled by other contacts of said relays for transmitting said signal elements of the five character code signals unchanged, and means responsive to the completion of said circuits for transmitting a sixth signal element of such identity that the total number of mark elements may vary in number as between different character codes but which has a predetermined numerical characteristic.

4. In a telegraph system, means for converting signals from a conventional five unit code to a six unit code in which each character code signal comprises six signal elements each having one or other of two electrical values the number of signal elements of one of said electrical values having a predetermined numerical characteristic, each six unit code including the five elements of the five unit code in their original relative positions and with their original electrical values, means for transmitting each said converted signal over two multiplexed transmission channels, receiving equipment coupled to said channels, said equipment comprising first scanning means for scanning a first of said channels and the first transmission to determine whether it has such predetermined numerical characteristics, means responsive to said scanning means for utilizing said first transmission in the event that it contains signal elements of said one electrical value in number having such predetermined numerical characteristic, means for suppressing said first transmission in the event that it does not contain signal elements of said one electrical value in number having such predetermined numerical characteristics, means for scanning said second transmission, and second scanning means responsive to said last-mentioned scanning means for utilizing said second transmission in the event that said first transmission is suppressed and said second transmission has said predetermined numerical characteristic.

5. A telegraph system as claimed in claim 4, further comprising error-indicating means coupled to said scanning means for providing an error indication in the event that neither said first nor said second transmission has said predetermined numerical characteristic, said last-named means having an operating circuit under control of respective of said scanning means.

6. A telegraph system as claimed in claim 4, in which said receiving equipment comprises a multiplex distributor and said first and second scanning means each comprise a plurality of scanning relays one for each signal element of received character codes, the windings of said relays being connected respectively to conducting segments of said distributor, and further comprising storage relay means for storing and repeating received signal elements and first and second switching relays for effecting an operative association between said first and second scanning relays and said storage relay means.

7. A telegraph system as claimed in claim 6, in which said distributor is arranged to produce first and second timing pulses and the closures of the circuits of said first and second switching relays are respectively effected under the control of said first and second timing pulses.

8. A telegraph system as claimed in claim 7, in which said distributor is arranged to produce third timing pulses and locking circuits are provided for said storage relay means, and further comprising means under the control of said third timing pulses for opening said locking circuits.

9. In a telegraph system, a transmitter for transmitting start-stop telegraph signals in which the character code signals each comprise a plurality of elements of either one or another of two electrical values, the number of elements of each electrical value having either an odd or an even numerical characteristic, said transmitter comprising a transmitting distributor, a first group of switch means, each responsive to different elements of the code making up said signals and having a plurality of contact sets, a first set of said contacts coupled to said distributor to record the operation or non-operation of respective of said switch means, a second set of said contacts connected in a chain and coupled to said distributor, a transfer relay under control of said distributor, a group of storage relays under joint control of said first-mentioned switch means and contacts associated with said transfer relay, each of said storage relays having a plurality of contacts sets, a third set of said contacts coupled to said distributor to record the operation or non-operation of respective of said storage relays, a fourth set of said contacts connected in a chain and coupled to said distributor, a release relay under control of said distributor, hold circuits for each of said storage relays including said fifth contact sets and contacts associated with said release relay in a series-parallel connection, a source of potential connected to respective of said contact chains whereby a predetermined polarity thereof is applied to said distributor whenever the elements of the code transmitted have the same predetermined numerical characteristics and each code character is twice transmitted as modified.

10. In a telegraph system, a receiver for receiving start-stop telegraph signals in which the character code signals each comprise a plurality of elements of either one or another of two electrical values having either an odd or an even numerical characteristic, said receiver comprising a receiving distributor, a pair of groups of storage relays, each relay having a plurality of contacts sets, an operating circuit for each relay of said groups under control of said distributor, a pair of error-indicating relays each having a plurality of contact sets, an operating circuit for each of said relays, each circuit including the first contacts sets of the relays of different of said said groups forming a pair of chains, a group of utilization relays, each having a plurality of contact sets, an operating circuit for each of said utilization devices, each circuit including a contact set of a first of said error-indicating relays, an alternative operating circuit for each of said utilization relays, each alternative circuit including a contact set of the other of said error-indicating relays, said error-indicating relays operable in response to the receipt of a code character not having elements of a given numerical characteristic.

11. In a telegraph system according to claim 1, means responsive to the said scanning means for suppressing received character code signals which do not have such predetermined numerical characteristics.

References Cited in the file of this patent

UNITED STATES PATENTS

| | | |
|---|---|---|
| 2,279,353 | Van Duuren | Apr. 14, 1942 |
| 2,552,629 | Hamming et al. | May 15, 1951 |
| 2,622,148 | Van Duuren | Dec. 16, 1952 |
| 2,674,727 | Spielberg | Apr. 6, 1954 |
| 2,713,084 | Berwin | July 12, 1955 |